United States Patent [19]

Nakamura et al.

[11] Patent Number: 5,695,213
[45] Date of Patent: Dec. 9, 1997

[54] SUSPENSION ARM

[75] Inventors: Daisuke Nakamura, Nagoya; Naoyasu Sugimoto; Yukikazu Ueno, both of Toyota, all of Japan

[73] Assignee: Toyota Jidosha Kabushiki Kaisha, Toyota, Japan

[21] Appl. No.: 636,692

[22] Filed: Apr. 23, 1996

[30] Foreign Application Priority Data

Apr. 28, 1995 [JP] Japan ..................... 7-106185

[51] Int. Cl.⁶ .......................................... B60G 7/00
[52] U.S. Cl. ................... 280/688; 280/673; 29/897.2; 52/731.6; 74/588
[58] Field of Search ........................ 280/690, 691, 280/688, 673, 663, 660, 96.1; 29/897.2; 74/588; 52/731.6, 735.1

[56] References Cited

U.S. PATENT DOCUMENTS

| 3,121,348 | 2/1964 | Reed ........................ 74/588 |
| 4,473,241 | 9/1984 | Von Der Ohe et al. ........ 52/731.6 |

FOREIGN PATENT DOCUMENTS

| 31 09 565 | 10/1982 | Germany . |
| 39 21 468 | 5/1990 | Germany ................ 280/688 |
| 41 42 587 | 7/1992 | Germany . |
| 41 32 779 | 4/1993 | Germany ................ 29/897.2 |
| 63-15203 | 2/1988 | Japan . |
| 6-143953 | 5/1994 | Japan . |
| 2 205 074 | 11/1988 | United Kingdom . |

OTHER PUBLICATIONS

Patent Abstracts of Japan, JP-A-7 315 025, Dec. 5, 1995, Masanobu Nakamura, "Arm for suspension and its Manufacture".
Toyota Technical Disclosure No. 4450, (1992).

*Primary Examiner*—Peter C. English
*Attorney, Agent, or Firm*—Oliff & Berridge

[57] ABSTRACT

A suspension arm in which the accuracy of a bush supporting portion is improved. The suspension arm is formed by respectively welding both side portions of an upper plate member and both side portions of a lower plate member to each other, the upper plate member and the lower plate member each having a substantially U-shaped cross-sectional configuration. The bush supporting portion is formed in such a manner that an upper cylindrical portion and a lower cylindrical portion are respectively formed by burring at rear ends of the upper plate member and the lower plate member. Further, clearances are respectively formed between the side portions of the upper plate member and the upper cylindrical portion, and between the side portions of the lower plate member and the lower cylindrical portion. Accordingly, there is no possibility that the heat generated upon welding is directly transmitted to the upper cylindrical member and the lower cylindrical member, so that the accuracy of the bush supporting portion can be improved.

18 Claims, 7 Drawing Sheets

SUSPENSION ARM

BACKGROUND OF THE INVENTION

1. Field of the Invention

The present invention relates to a suspension arm which is formed by welding an open-side end portion of a first plate member having a substantially U-shaped cross-sectional configuration to an open-side end portion of a second plate member having a substantially U-shaped cross-sectional configuration and which has a cylindrical bush supporting portion whose axial direction generally coincides with the direction from the first plate member to the second plate member.

2. Description of the Related Art

There have been known various types of suspensions such as a double wishbone type suspension, a strut type suspension, a multi link suspension, a trailing arm-type suspension, and the like. Correspondingly, various types of suspension arms which form the suspensions have been proposed heretofore. From the configurational standpoint, an A-type arm, L-type arm, I-type arm, and the like have been known, and from the structural standpoint, a pipe-shaped arm, an arm formed by pressing a steel plate, an arm formed by forging aluminum and the like have been known.

As described above, various types of suspension arms have been known. Among them, a suspension arm is hereinafter described briefly which is formed by welding two sheets of pressed plate-shaped members to each other. One example of this type of suspension arm is disclosed in TOYOTA TECHNICAL DISCLOSURE No. 4450 (published on Feb. 28, 1992).

FIG. 7 shows a front view of an L-type lower arm 100 which is the suspension arm disclosed in the above-described publication. As shown in this drawing, the L-type lower arm 100 includes an upper plate member 102 forming an arm upper side and a lower plate member 104 forming an arm lower side and is formed by welding respective open-side end portions 102A, 104A of the upper plate member 102 and the lower plate member 104 to each other. A cylindrical bush supporting portion 106 whose axial direction coincides with a vertical direction of a vehicle is mounted by welding to an inboard-side end of the L-type lower arm 100. An unillustrated bush is provided to be inserted in the bush supporting portion 106 with pressure.

With the above-described arrangement, however, there exists a drawback in that heat generated when the bush supporting portion 106 is welded to the inboard-side end of the L-type lower arm 100 is directly transmitted to the bush supporting portion 106. In this case, since distortion of the bush supporting portion 106 due to the heat needs to be taken into consideration, the mounting accuracy of the bush supporting portion 106 (and therefore, the axial accuracy of the bush to be inserted in the bush supporting portion 106 with pressure) is difficult to be maintained.

Meanwhile, as the related art of the present invention, there have been disclosed a suspension arm described in Japanese Patent Application Laid-Open No. 6-143953 in which an upper plate member and a lower plate member are both bent and an end of one of the upper plate member and the lower plate member is welded to a lateral portion of an end of the other of the upper plate member and the lower plate member to form a hollow structure, and a suspension arm described in Japanese Utility Model Application Laid-Open No. 63-15203 in which one of flange portions respectively formed in an upper plate member and a lower plate member extends and bends inwardly in a folded manner to form a hollow structure.

SUMMARY OF THE INVENTION

In view of the above-described circumstances, it is an object of the present invention to provide a suspension arm which can improve the accuracy of a bush supporting portion.

The present invention is a suspension arm which comprises: a first plate member having a substantially U-shaped cross-sectional configuration and having a first open-side end portion; a second plate member having a substantially U-shaped cross-sectional configuration and having a second open-side end portion; and a bush supporting portion which is formed into the shape of a cylinder and of which axial direction coincides with a direction from the first plate member to the second plate member, wherein the suspension arm is formed by welding the first open-side end portion and the second open-side end portion to each other and the bush supporting portion is formed by a first cylindrical portion formed by a predetermined portion of the first plate member being bent toward an interior of an arm cross-section, and a second cylindrical portion formed by a predetermined portion of the second plate member being bent toward an interior of the arm cross-section, and wherein respective ends of the first cylindrical portion and the second cylindrical portion are disposed opposingly and predetermined clearances are respectively formed between the first cylindrical portion and the first open-side end portion which is a joining portion, and between the second cylindrical portion and the second open-side end portion which is the joining portion.

in accordance with the present invention, the suspension arm is formed by welding respective open-side end portions of the first plate member and the second plate member to each other, the first plate member and the second plate member each having a substantially U-shaped cross-sectional configuration. The bush supporting portion is formed by a first cylindrical portion provided by the predetermined portion of the first plate member being bent toward an interior of the arm cross-section, and a second cylindrical portion provided by the predetermined portion of the second plate member being bent toward the interior of the arm cross-section. At this time, respective ends of the first cylindrical portion and the second cylindrical portion are disposed opposingly. As a result, the bush can be inserted into the bush supporting portion with pressure.

With the structure of the present invention, clearances are respectively formed between the first cylindrical portion and the open-side end portion of the first plate member which is the welded portion, and between the second cylindrical portion and the open-side end portion of the second plate member which is the welded portion. Accordingly, the heat generated at the time of welding is not directly transmitted to the first cylindrical portion and the second cylindrical portion. For this reason. distortion due to the heat upon welding does not occur in the first cylindrical portion and the second cylindrical portion (i.e., in the bush supporting portion). As a result, the accuracy of the bush supporting portion and the mounting accuracy of the bush can be improved.

DESCRIPTION OF THE PREFERRED EMBODIMENTS

Referring now to FIGS. 1 through 5, a description will be hereinafter given of a suspension arm to which the present invention is applied.

Figure 3:
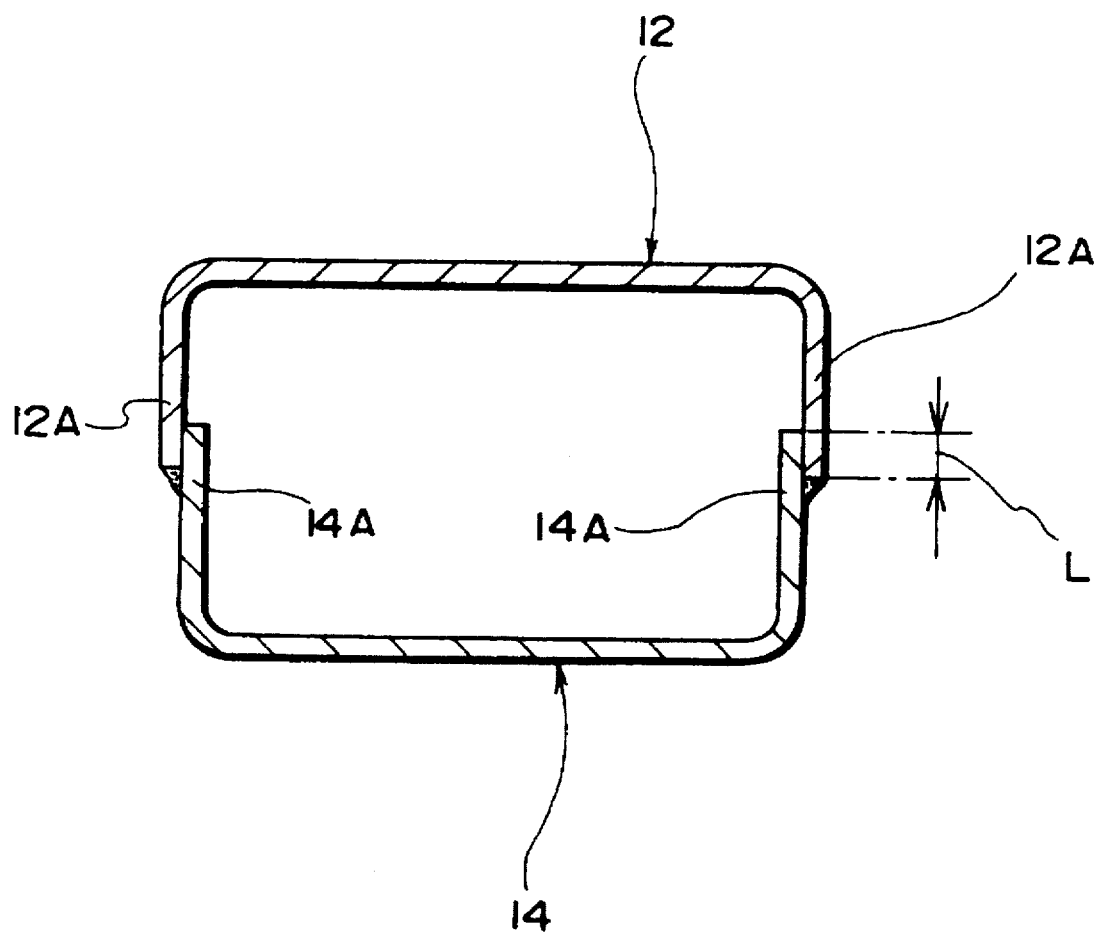
FIG. 3 is a cross-sectional view of a portion of the suspension arm shown in FIG. 1, taken along the lines 3—3 in FIG. 5.
Figure 5:
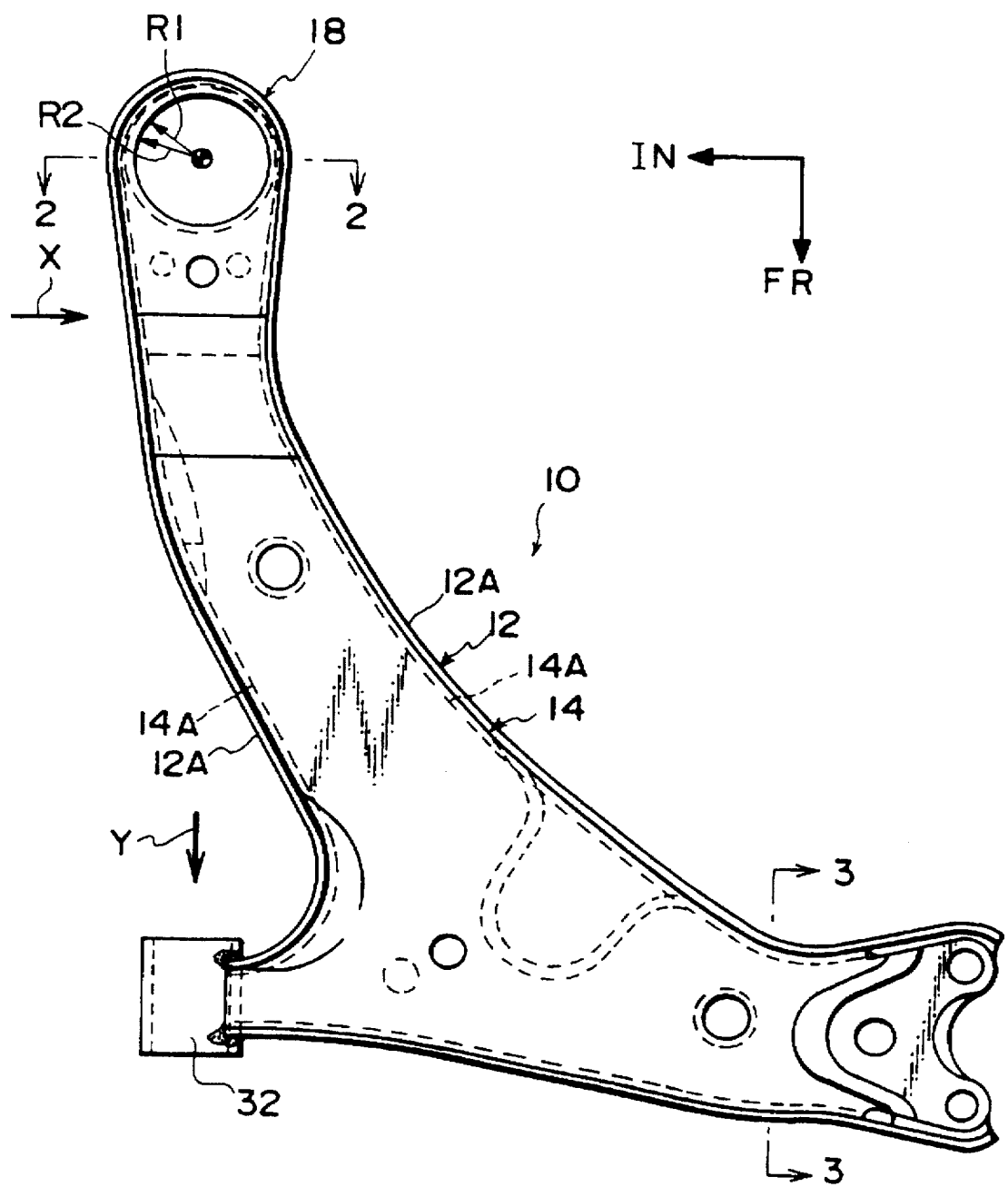
FIG. 5 is a plan view showing an overall construction of the suspension arm according to the embodiment of the present invention.

FIG. 5 shows a bottom view of an L-type suspension arm 10 and FIG. 3 shows a cross-sectional view illustrating a cross-sectional configuration of a portion of the suspension arm 10. As shown in these drawings, the suspension arm 10 is formed by an upper plate member 12 having a substantially U-shaped cross-sectional configuration and forming an arm upper side, and a lower plate member 14 having a substantially U-shaped cross-sectional configuration and forming an arm lower side. The upper plate member 12 and the lower plate member 14 respectively serve as a first plate member and a second plate member. It should be noted that the upper plate member 12 and the lower plate member 14 have both substantially U-shaped configurations when seen from a plan view.

Figure 2:
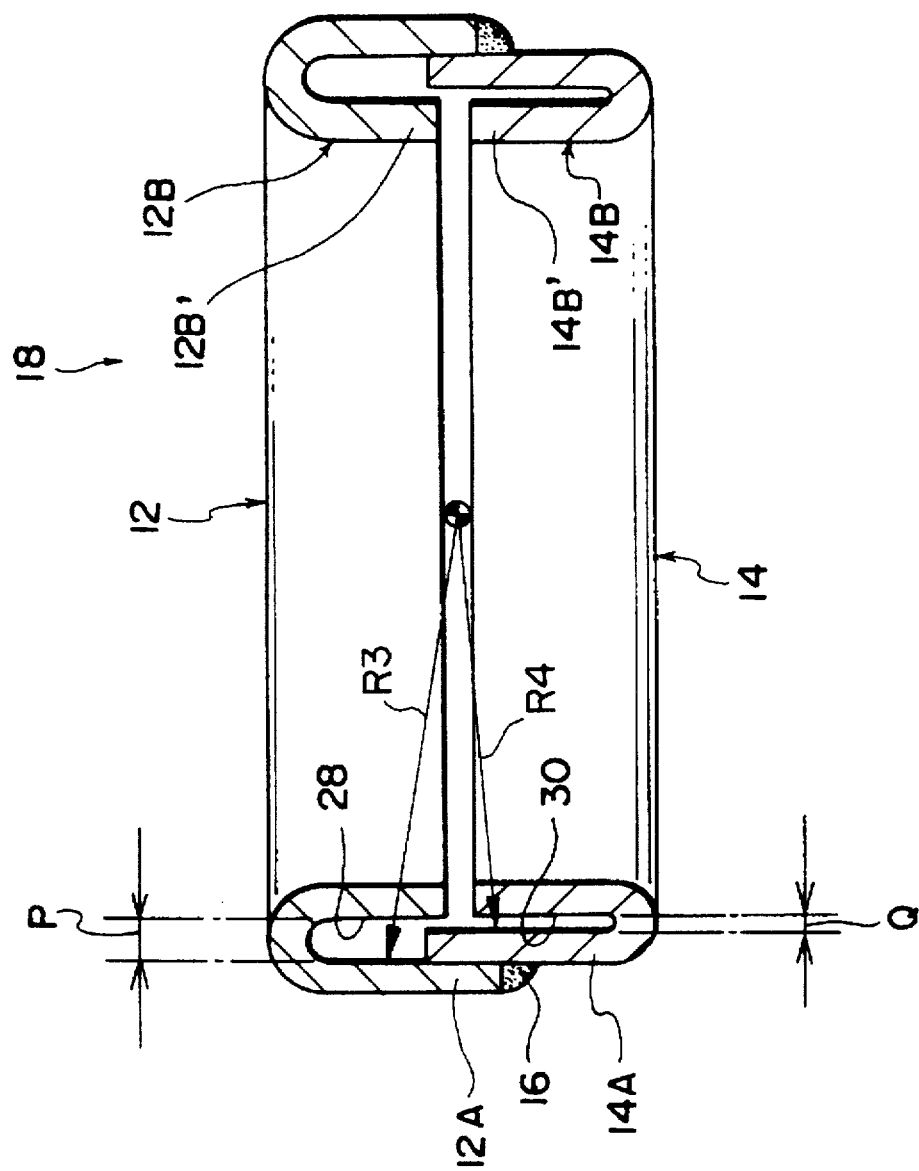
FIG. 2 is a cross-sectional view of the bush supporting portion shown in FIG. 1, taken along the lines 2—2 in FIG. 5.

The distance between respective inner surfaces of side portions 12A of the upper plate member 12 is set generally equal to that between respective external surfaces of side portions 14A of the lower plate member 14 and the upper plate member 12 overlaps with the lower plate member 14 in the vertical direction by a length L (see FIG. 3). In the state in which the upper plate member 12 and the lower plate member 14 partially overlap with each other in the vertical direction, each of the side portions 12A of the upper plate member 12 and each of the side portions 14A of the lower plate member 14 are welded to each other at each terminal end of the side portions 12A of the upper plate member 12 (i.e., at each lower end of the side portions 12A). Meanwhile, a welding material 16 is shown in FIG. 2. Consequently, the suspension arm 10 has a substantially rectangle-shaped closed cross-sectional configuration.

Figure 1:
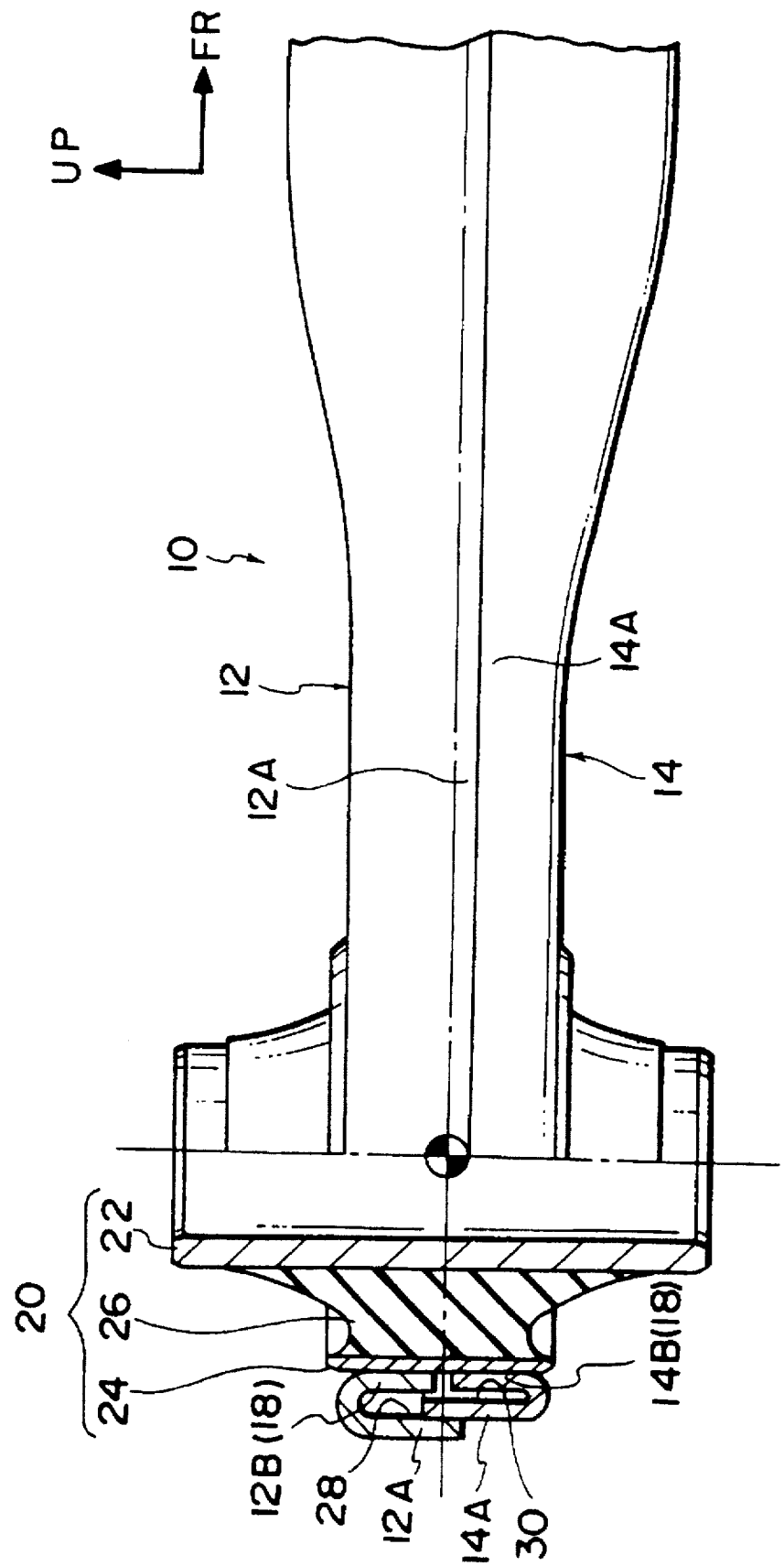
FIG. 1 is a side view of a suspension arm according to an embodiment of the present invention when seen from the direction indicated by arrow X in FIG. 5, with a bush supporting portion and its vicinities being partially cut away.

A detailed description will be given hereinafter of the structure of a bush supporting portion 18 provided at the rear end of the above-described suspension arm 10. FIG. 2 shows a cross-sectional configuration of the bush supporting portion 18 taken along the lines 2—2 in FIG. 5 and FIG. 1 shows a partially cross-sectional view of the state in which a bush 20 is inserted in the bush supporting portion 18 with pressure. As shown in these drawings, the rear end of the upper plate member 12 is subjected to burring processing. As a result, in addition to the side portions 12A, an upper cylindrical portion 12B serving as a first cylindrical portion is provided at the rear end of the upper plate member 12 in such a manner as to bend toward an interior of an arm cross-section along the side portions 12A. The rear end of the lower plate member 14 is subjected to burring processing in the same way as the rear end of the upper plate member 12. As a result, in addition to the side portions 14A, a lower cylindrical portion 14B serving as a second cylindrical portion is provided at the rear end of the lower plate member 14 in such a manner as to bend toward an interior of the arm cross-section along the side portions 14A.

Respective axial dimensions of the upper cylindrical portion 12B and the lower cylindrical portion 14B substantially coincide with each other. An end 12B' of the upper cylindrical portion 12B and an end 14B' of the lower cylindrical portion 14B are disposed opposingly. The above-described upper cylindrical portion 12B and lower cylindrical portion 14B form the cylindrical bush supporting portion 18, into which the bush 20 is inserted with pressure. It should be noted that the bush 20 is formed from an inner cylinder 22, an outer cylinder 24, and an elastic body 26 such as rubber which is interposed between the inner cylinder 22 and the outer cylinder 24, and the axial direction of the bush 20 coincides with the vertical direction of the vehicle (see FIG. 1).

As shown in FIG. 2, a clearance 28 is formed between an inner surface of the side portion 12A of the upper plate member 12, which serves as a welded portion, and an external surface of the upper cylindrical portion 12B and has a dimension P therebetween. Similarly, a clearance 30 is formed between an inner surface of the side portion 14A of the lower plate member 14, which serves as a welded portion, and an external surface of the lower cylindrical portion 14B and has a dimension Q therebetween.

The dimension Q of the clearance 30 is smaller than the dimension P of the clearance 28 by a thickness of the side portion 12A of the upper plate member 12.

As seen from FIGS. 2 and 5, a distance R1 between the axial line of the bush 20 and the upper cylindrical portion 12B and a distance R2 between the axial line of the bush 20 and the lower cylindrical portion 14B are substantially equal to each other. A distance R3 between the axial line of the bush 20 and the inner surface of the side portion 12A of the upper plate member 12 is greater than a distance R4 between the axial line of the bush 20 and the inner surface of the side portion 14A of the lower plate member 14.

Figure 4A:
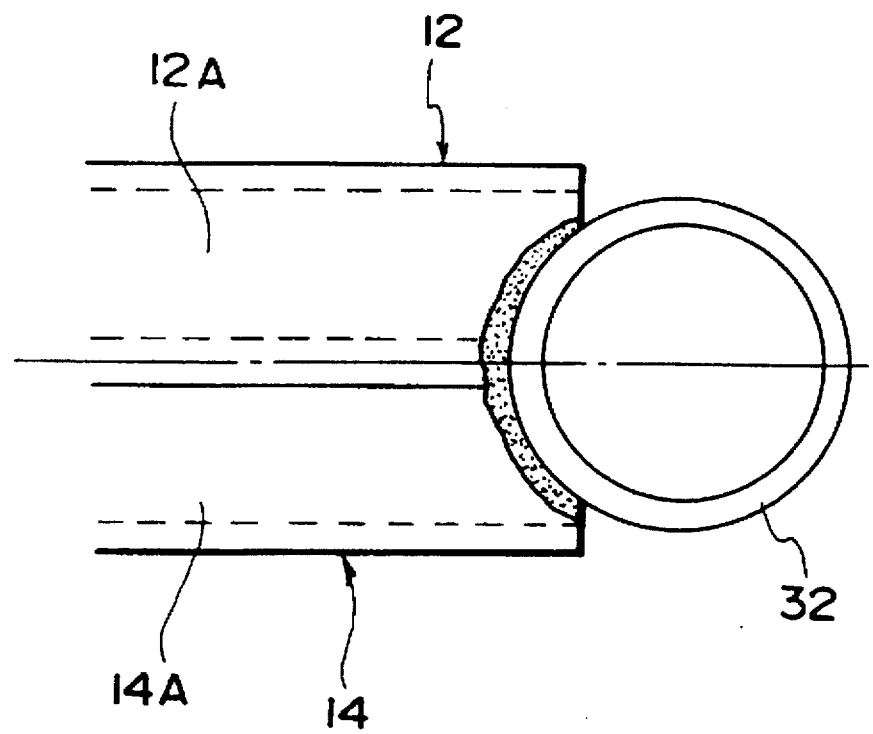
FIG. 4A is a side view showing a state in which a bush supporting portion formed as a separate body is mounted to the suspension arm when seen from the direction indicated by arrow Y in FIG. 5.
Figure 4B:
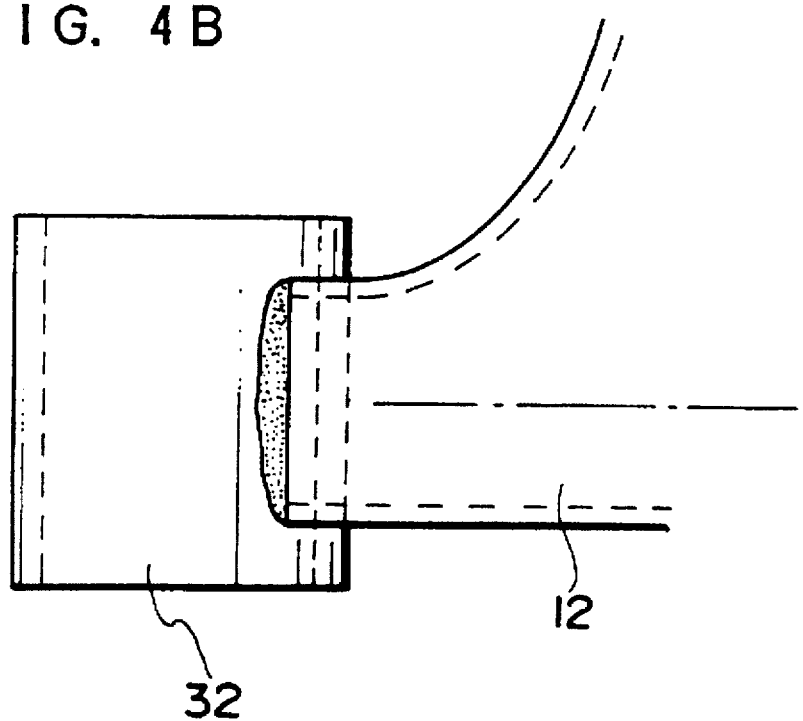
FIG. 4B is a plan view of FIG. 4A.

On the other hand, as shown in FIGS. 4A and 4B, a cylindrical bush supporting portion 32 of which axial direction coincides with the longitudinal direction of the vehicle is fixed by welding to a front end portion of the suspension arm 10. Namely, because the direction in which the bush supporting portion 32 is welded to the suspension arm 10 is deviated from those in which the upper plate member 12 and the lower plate member 14 are welded to each other by an angle of 90° for the reason that the axial line of a bush (not shown) to be inserted with pressure in the bush supporting portion 32 is provided in the longitudinal direction of the vehicle as described above the bush supporting portion 32 is provided separately from the suspension arm 10. Further, a lower end of a carrier (not shown) which supports a wheel is mounted at an outboard-side end of the suspension arm 10.

Next, operation and effects of the present embodiment will be described.

The L-type suspension arm 10 having a hollow structure and a rectangle-shaped cross-sectional configuration is formed in such a manner that the upper plate member 12 having a substantially U-shaped cross-sectional configuration overlaps with the lower plate member 14 having a substantially U-shaped cross-sectional configuration in the vertical direction of the vehicle by a predetermined length and the side portions 12A of the upper plate member 12 and the side portions 14A of the lower plate member 14 are respectively welded to each other with the upper plate member 12 and the lower plate member 14 overlapping with each other. In this state the end 12B' of the upper cylindrical portion 12B and the end 14B' of the lower cylindrical portion 14B, each end being formed by burring, are disposed opposingly. The bush 20 whose axial direction coincides with the vertical direction of the vehicle is inserted with pressure in the substantially cylinder-shaped bush supporting portion 18 which is formed by the upper cylindrical portion 12B and the lower cylindrical portion 14B.

With this embodiment, the clearance 28 is formed between the inner surface of the side portion 12A of the upper plate member 12 which is the welded portion and the external surface of the upper cylindrical portion 12B to have dimension P therebetween and the clearance 30 is formed between the inner surface of the side portion 14A of the lower plate member 14 which is the welded portion and the external surface of the lower cylindrical portion 14B to have dimension Q therebetween, with the result that the heat generated when the side portions 12A of the upper plate member 12 and the side portions 14A of the lower plate member 14 are respectively welded to each other is not directly transmitted to the upper cylindrical portion 12B and the lower cylindrical portion 14B. For this reason, distortion due to the heat at the time of welding does not occur in the upper cylindrical portion 12B and the lower cylindrical portion 14B. Accordingly, the present embodiment makes it possible to improve the accuracy of the bush supporting portion 18 and the mounting accuracy of the bush 20. Meanwhile the present embodiment is constructed in that the end 12B' of the upper cylindrical portion 12B and the end 14B' of the lower cylindrical portion 14B are disposed opposingly so as not to be welded to each other, which is also effective for the reason that the heat due to welding is not influenced upon the bush supporting portion 18.

Further, since the upper cylindrical portion 12B and the lower cylindrical portion 14B are respectively formed by burring in the upper plate member 12 and the lower plate member 14, each burring length of the upper cylindrical portion 12B and the lower cylindrical portion 14B can be shortened. For this reason, the bush supporting portion 18 can be easily processed and the accuracy required to insert the bush 20 therein with pressure can be easily maintained. In addition, a portion of the suspension arm 10 in the vicinity of the bush supporting portion 18 has a double cylinder-shaped cross-sectional configuration due to the above-described structure of the bush supporting portion so that the strength of the bush supporting portion 18 can be improved.

Figure 6:
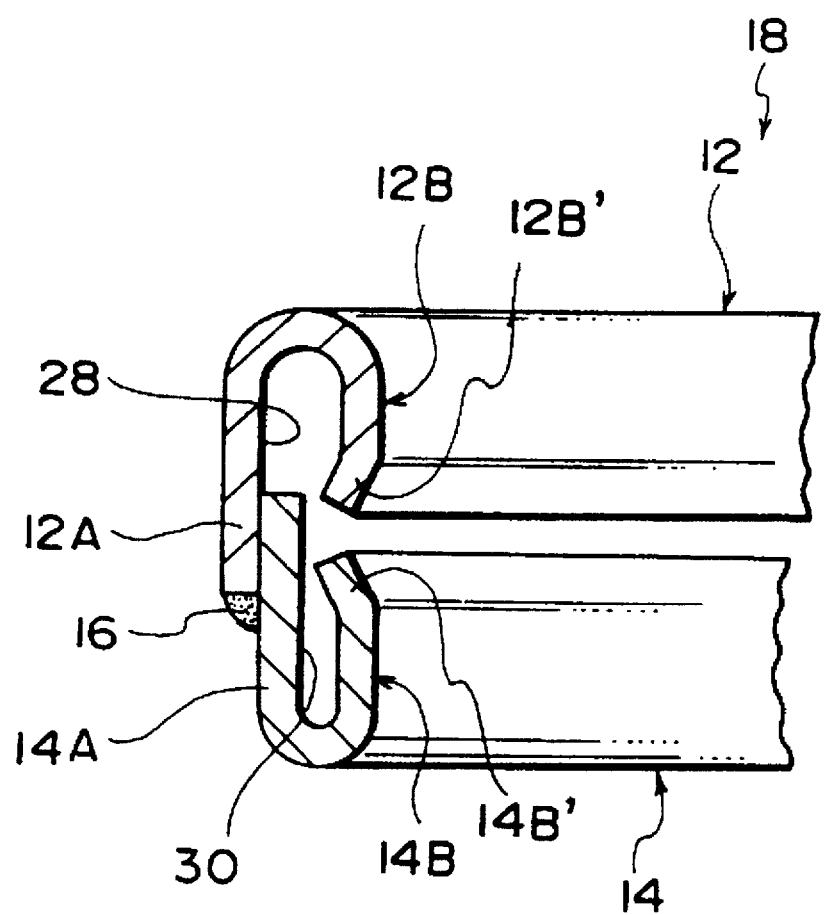
FIG. 6 is a cross-sectional view showing the structure of a bush supporting portion according to a modified example of the present invention, which corresponds to FIG. 2.
Figure 7:
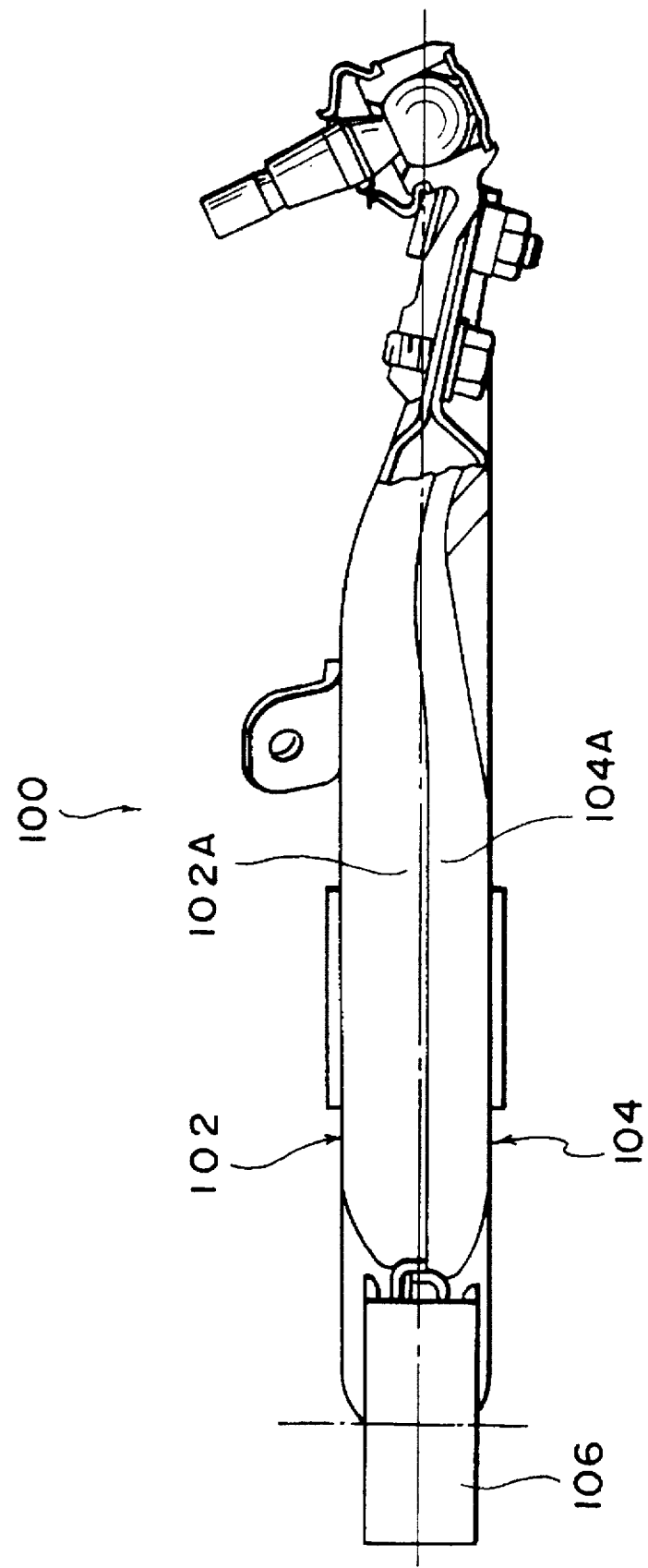
FIG. 7 is a perspective view showing the construction of a conventional suspension arm.

As shown in FIG. 2, in the present embodiment, the end 12B' of the upper cylindrical portion 12B and the end 14B' of the lower cylindrical portion 14B are respectively formed linearly, not to be bent. However, the present invention is not limited to the same. For example, as shown in FIG. 6, the end 12B' of the upper cylindrical portion 12B and the end 14B' of the lower cylindrical portion 14B may be beforehand formed to be bent toward an exterior side of the bush supporting portion 18 in a radial direction thereof. In this case, there is an advantage in that, when the bush 20 is inserted in the bush supporting portion 18 with pressure, an outer cylinder 24 of the bush 20 is not caught by the end 12B' of the upper cylinder portion 12B and the end 14B' of the lower cylinder portion 14B.

Further, in the present embodiment, the present invention is applied to the L-type suspension arm 10. However, the present invention is not limited to the same and can be applied to various types of suspension arms.

Although the bush 20 of the present embodiment has the outer cylinder 24, the bush including no outer cylinder may be applied and can be modified within a range in which the present invention is applied.

Moreover, in the present embodiment, the side portion 12A of the upper plate member 12 and the side portion 14A of the lower plate member 14 are joined together by welding. However, the present invention is not limited to the same. For example, in a joining method in which no heat is required, the bush supporting portion 18 is not affected by the joining portion when joining and the deformation thereof due to heat is not caused accordingly.

What is claimed is:

1. A suspension arm comprising:

a first plate member having a substantially U-shaped cross-sectional configuration and having a first open-side end portion;

a second plate member having a substantially U-shaped cross-sectional configuration and having a second open-side end portion; and a bush supporting portion which is formed into the shape of a cylinder and of which an axial direction coincides with a direction from said first plate member to said second plate member, wherein said suspension arm is formed by welding the first open-side end portion and the second open-side end portion to each other and said bush supporting portion is formed by a first cylindrical portion formed by a predetermined portion of said first plate member being bent toward an interior of an arm cross-section, and a second cylindrical portion formed by a predetermined portion of said second plate member being bent toward an interior of the arm cross-section, wherein one end of the first cylindrical portion and one end of the second cylindrical portion are disposed opposingly in the axial direction and predetermined clearances are respectively formed between the first cylindrical portion and the first open-side end portion which is a joining portion, and between the second cylindrical portion and the second open-side end portion which is a joining portion, and wherein a dimension of the clearance between the first cylindrical portion and the open-side end portion of said first plate member is greater than a dimension of the clearance between the second cylindrical portion and the open-side end portion of said second plate member.

2. A suspension arm according to claim 1, wherein said first plate member and said second plate member form an upper side and a lower side of the suspension arm, respectively.

3. A suspension arm according to claim 2, wherein the ends of the first cylindrical portion and the second cylindrical portion are respectively bent toward an exterior side of said bush supporting portion in a radial direction thereof.

4. A suspension arm according to claim 1, wherein the first cylindrical portion is formed with the predetermined portion of said first plate member being bent toward the arm cross-section by burring.

5. A suspension arm according to claim 1, wherein the second cylindrical portion is formed with the predetermined portion of said second plate member being bent toward the arm cross-section by burring.

6. A suspension arm according to claim 1, wherein a dimension of the first cylindrical portion in an axial direction of said bush supporting portion substantially coincides with a dimension of the second cylindrical portion in a direction opposite to the axial direction of said bush supporting portion.

7. A suspension arm according to claim 1, wherein a dimension of a clearance between the ends of the first cylindrical portion and the second cylindrical portion which are disposed opposingly is set substantially at a fixed value.

8. A suspension arm according to claim 1, wherein the ends of the first cylindrical portion and the second cylindrical portion are respectively formed linearly.

9. A suspension arm according to claim 1, wherein said bush supporting portion is provided such that a bush formed by an inner cylinder, an elastic body and an outer cylinder can be inserted therein with pressure.

10. A suspension arm according to claim 9, wherein an outer peripheral surface of the outer cylinder of the bush contacts an inner peripheral surface of said bush supporting portion.

11. A suspension arm according to claim 9, wherein the ends of the first cylindrical portion and the second cylindrical portion are respectively bent toward an exterior side of said bush supporting portion so as to be brought into a noncontact state with the bush.

12. A suspension arm according to claim 1, wherein a dimension of a clearance between the first cylindrical portion and the first open-side end portion of said first plate member is set substantially at a fixed value.

13. A suspension arm according to claim 1, wherein a dimension of a clearance between the second cylindrical portion and the second open-side end portion of said second plate member is set substantially at a fixed value.

14. A suspension arm according to claim 1, wherein peripheral surfaces having a substantially same first radius of curvature are respectively formed in the first cylindrical portion and the second cylindrical portion.

15. A suspension arm according to claim 14, wherein said first plate member and said second plate member each have a different radius of curvature from the first radius of curvature so as to protect said bush supporting portion.

16. A suspension arm according to claim 1, wherein a peripheral surface having a second radius of curvature is formed in said second plate member and a peripheral surface having a third radius of curvature is formed in said first plate member.

17. A suspension arm according to claim 16, wherein the third radius of curvature is greater than the second radius of curvature.

18. A suspension arm according to claim 1, wherein the ends of the first cylindrical portion and the second cylindrical portion are respectively bent toward an exterior side of said bush supporting portion in a radial direction thereof.

* * * * *